US 8,437,461 B1

(12) United States Patent
Gartner et al.

(10) Patent No.: US 8,437,461 B1
(45) Date of Patent: May 7, 2013

(54) CONFERENCE PARTICIPANT FINDER METHOD AND APPARATUS (75) Inventors: Jeffrey G. Gartner, Hopewell Junction, NY (US); Humphrey D. Chen, Palisades Park, NJ (US)

(73) Assignee: Avaya Inc., Basking Ridge, NJ (US)

( * ) Notice: Subject to any disclaimer, the term of this patent is extended or adjusted under 35 U.S.C. 154(b) by 585 days.

(21) Appl. No.: 12/392,823

(22) Filed: Feb. 25, 2009

(51) Int. Cl.
*H04M 3/42* (2006.01)

(52) U.S. Cl.
USPC ..................... 379/202.01; 379/158

(58) Field of Classification Search ............ 379/202.01, 379/158, 203.01, 204.01, 205.01, 206.01, 379/207.01–207.04
See application file for complete search history.

(56) References Cited

U.S. PATENT DOCUMENTS

| 2003/0053612 | A1* | 3/2003 | Henrikson et al. ........ 379/202.01 |
| 2005/0033615 | A1* | 2/2005 | Nguyen et al. ................. 705/5 |
| 2007/0180393 | A1* | 8/2007 | Dagenbach et al. .......... 715/769 |
| 2007/0250366 | A1* | 10/2007 | Nurmi ............................... 705/8 |
| 2007/0291917 | A1 | 12/2007 | Berstis et al. |
| 2008/0052354 | A1* | 2/2008 | Barber-Mingo et al. ..... 709/204 |
| 2008/0120381 | A1* | 5/2008 | Awan et al. ................... 709/206 |
| 2009/0222519 | A1* | 9/2009 | Boyd ............................. 709/204 |
| 2010/0121666 | A1* | 5/2010 | Niazi ................................ 705/8 |
| 2010/0200728 | A1* | 8/2010 | Ingber ........................... 250/205 |

OTHER PUBLICATIONS

U.S. Appl. No. 12/243,142, Entitled "A System and Method of Managing Conference Calls Through the Use of Filtered Lists of Participants", Michaelis et al., filed Oct. 1, 2008.

* cited by examiner

*Primary Examiner* — William Deane, Jr.
(74) *Attorney, Agent, or Firm* — Sheridan Ross P.C.

(57) ABSTRACT

Conference participant finder methods and apparatuses are provided. The conference participant finder maintains a record of expected conference participants. After the scheduled start time of a conference, expected conference participants are automatically contacted and reminded to join the conference. The contact address used to contact an expected conference participant can be obtained with reference to presence information. In addition, information regarding the status of conference participants can be displayed to a conference host.

14 Claims, 4 Drawing Sheets

CONFERENCE PARTICIPANT FINDER METHOD AND APPARATUS

FIELD OF THE INVENTION

Conference participant finder methods and apparatuses are provided. In particular, methods and systems for contacting conference call participants who are not present at the start of a conference call are provided.

BACKGROUND

Conference calls are commonly used by businesses as a way to conduct meetings. In setting up a conference call, the host or organizer will typically ask the participants to call into a particular number, or to be ready to receive a call, at a specified date and time. In order to facilitate this process, various systems and applications have been developed. For example, applications having email and calendar functions allow a conference organizer to send invitations to desired participants. A desired participant can reply by indicating whether or not they accept the invitation to participate in the conference call. The replies from desired participants can be collected by the organizer's email and calendar program, to indicate to the organizer whether or not particular participants have accepted or declined the invitation.

At the start of a conference call, it is common for at least some of the expected participants to be absent from the call. As a result, significant time at the beginning of a conference call can be spent attempting to contact the missing but expected participants. Such attempts to contact missing participants typically involve the organizer manually checking to see which of the participants who accepted the invitation are absent from the call. The organizer or the participants must then manually locate a contact address for the missing participant, and attempt to contact the participant through one of a variety of means such as instant messaging, email or calling them to remind them of the call. This is a significant waste of time for the attendees that have joined on time. In fact, often time a critical person who has accepted, can not be contacted and the conference will have to be rescheduled.

In order to facilitate the initiation of a conference call, systems have been developed with options that automatically call out to designated participants. Where an initial call to a participant is unanswered, that participant can be called back at selected intervals. According to such systems, all invited participants are called. Therefore, time and resources can be wasted attempting to contact participants who have declined the invitation to participate in the conference call.

Other solutions require the conference host or other participants in attendance to use alternate communication channels in order to locate missing attendees. For example, attempts can be made to contact missing attendees by other modes of communication, such as email or instant messaging, that do not require the current attendees and/or the host to leave the call. However, this requires that the conference be put on hold. In addition, such techniques require that the party initiating the contact have all of the addresses and other contact information for the missing participant that allows use of such alternate modes of communication.

SUMMARY

In accordance with embodiments of the present invention, methods and apparatuses for finding and contacting conference participants are provided. In particular, the invitee list from the conference host or organizer's calendar is parsed and the conference invitees are categorized. This categorization can include the categories of: 1) in the conference; 2) accepted but not present; and 3) declined. Conference participants that have accepted but are not present can be identified and contacted automatically. Moreover, such contact may be made using any one of a number of communication modes, potentially leveraging their presence state including IM and telephony, and using an address or phone number for the participant that is identified automatically and can be based on personal preferences. Additionally, the various contact means can be initiated sequentially or in parallel to locate the missing participant.

In accordance with further embodiments of the present invention, a participant who has accepted but is not present, and who is successfully contacted after the start of the conference, can be provided with an option to join the conference late. The missing attendee can also indicate they are no longer able to join the call. Where such a facility is provided, the missing attendee can indicate that they will join but at a later time in the call and they can indicate the time specifically or elapsed time at which they will be available to join the conference. That participant can then be contacted again at the indicated time.

In accordance with further embodiments of the present invention, the conference host, organizer or even the participants can be presented with status information regarding invited participants. This status information can be presented as a listing of the invited participants, and an indication as to whether they have accepted or declined participation in the conference call. In addition, for participants who have accepted the invitation, whether the participant is already on the call, or the estimated arrival time for the participant, can be presented. Moreover, a user interface that allows the conference host to control aspects of attempts to contact conference participants who are expected but are not present, such as when, how many, and with what frequency further attempts to contact the participant are made, whether the participant is provided with an option to defer joining the conference, and the options available to a participant who is given an opportunity to defer joining the conference.

Additional features and advantages of embodiments of the present invention will become more readily apparent from the following description, particularly when taken together with the accompanying drawings.

DETAILED DESCRIPTION

Figure 1:
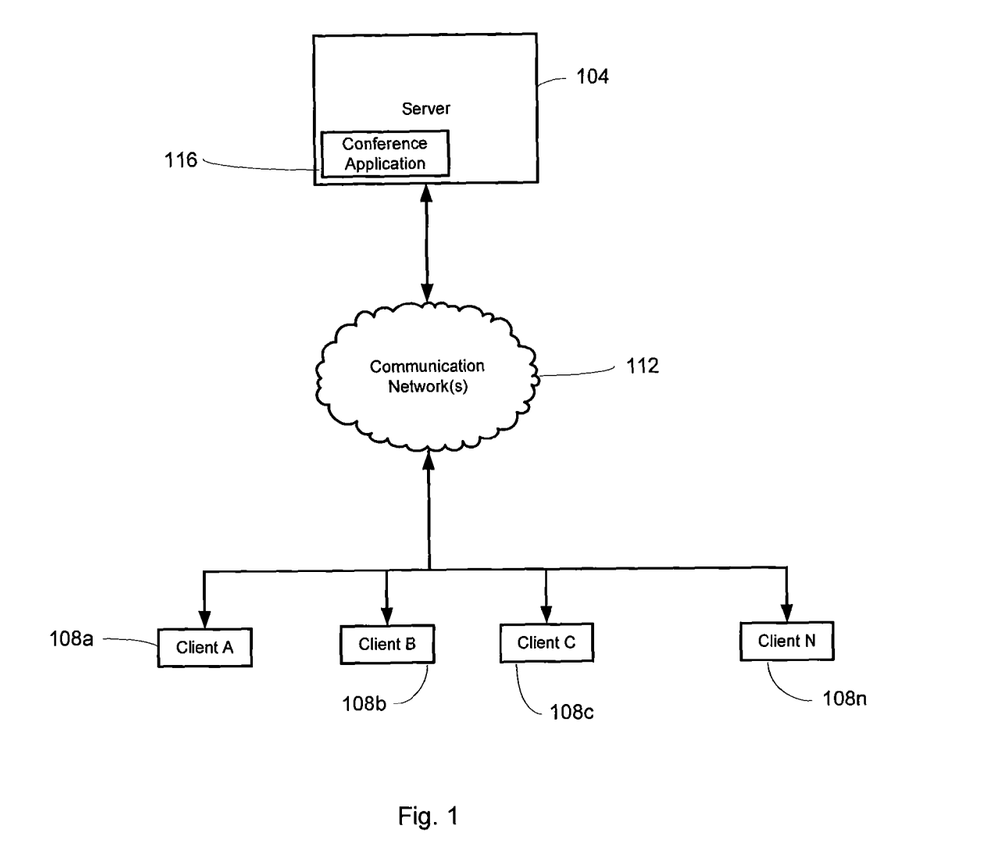
FIG. 1 depicts a communication arrangement that can incorporate a conference participant finder feature in accordance with embodiments of the present invention.

FIG. 1 is a block diagram illustrating a communication system 100 that incorporates a conference participant finder facility in accordance with embodiments of the present invention. The system 100 includes a server 104 interconnected to a plurality of client devices 108 by one or more communication networks 112. The server 104 comprises a conference application 116 comprising instructions capable of implementing a conference participant finder in accordance with embodiments of the present invention.

In general, the server 104 may comprise a communication server capable of running program instructions, including the conference application 116. In addition, the server 104 may implement or have access to a database for storing information regarding a particular conference, and information regarding the participants included in that conference and their status. Accordingly, the server 104 may comprise any device capable of running the conference finder application 116 and communicating with client devices 108 via a communication network 112.

The communication network or networks 112 could be any type of network, such as a wired network, a wireless network, a fiber optic network, and the like. In addition, the communication network 112 may comprise a plurality of networks and/or a plurality of networks of different types.

The client devices 108 could be any device that can communicate over a communication network 112, such as a telephone, a personal computer, a cellular telephone, a personal digital assistant, and the like. Moreover, the different client devices 108 may be the same as or different from one another. For example, client device A 108a could be a personal computer running a variety of programs, such as a telephony or video telephony communication application and various other applications. As a further example, client device B 108b may comprise a telephone operated in combination or concurrently with a personal computer at the direction of a common user or conference participant. Client C 108c could comprise a personal digital assistant implementing a wireless telephone and various applications, such as an email and/or instant messaging communication application and a calendar application. As still another example, client N 108n may comprise a telephone. The foregoing examples of client devices 108 should not be considered limiting, and are instead provided for illustration purposes. In addition, although four client devices 108a-n are illustrated in FIG. 1, it should be appreciated that a system implementing or comprising a conference participant finder in accordance with embodiments of the present invention is not limited to use in association with any particular number of client devices 108. Moreover, it should be appreciated that other topographies, including those in which the conference application 116 is executed by a client device 108, can be implemented. For example, the conference application or any portion of the conference application may reside in fact on the client device itself.

Figure 2:
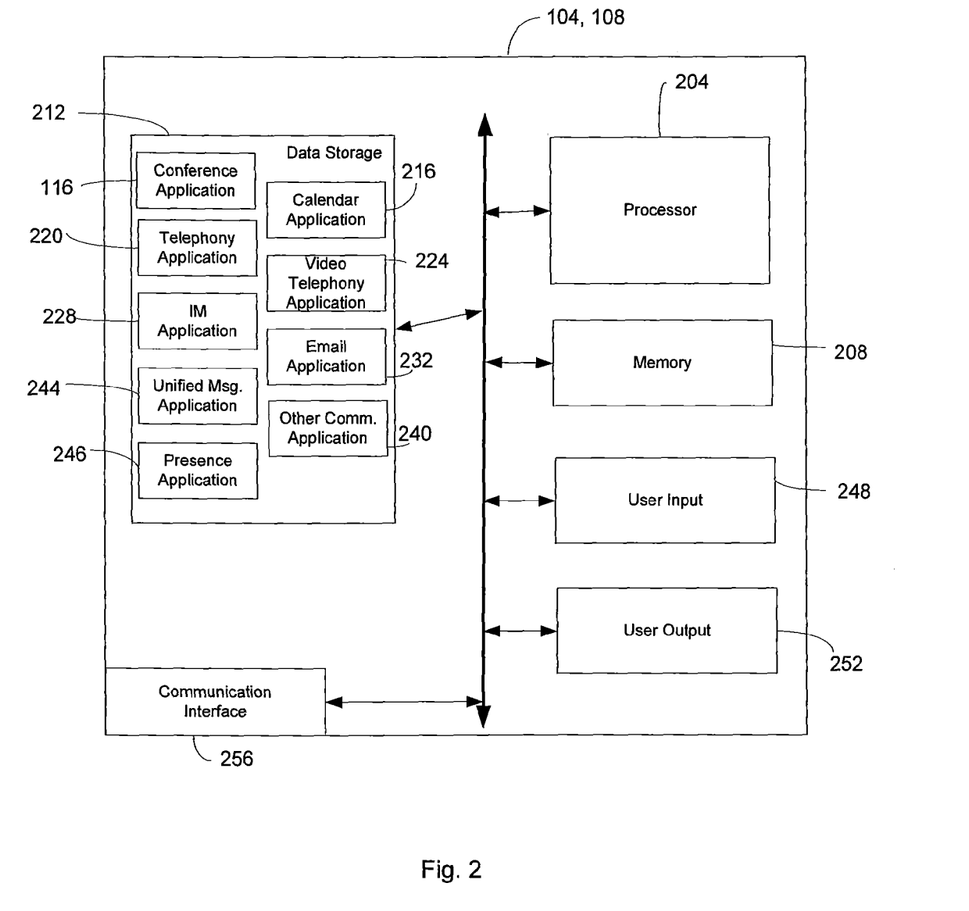
FIG. 2 is a block diagram depicting aspects of a client device incorporating conference participant finder features in accordance with embodiments of the present invention.

FIG. 2 illustrates components of a server 104 and/or a client device 108 in accordance with embodiments of the present invention. The components may include a processor 104 capable of executing program instructions or software. Accordingly, the processor 204 may include any general purpose programmable processor or controller for executing application programming or instructions. As a further example, the processor 204 may comprise a specially configured application specific integrated circuit (ASIC). The processor 204 generally functions to run programming code or instructions implementing various other functions performed by the server 104 or client device 108. As will be described in greater detail herein, such functions may include conferencing, communications, calendaring, and other functions.

A server 104 and/or a client device 108 may additionally include memory 208 for use in connection with the execution of programming by the processor 204, and for the temporary or long term storage of program instructions and/or data. Alternatively or in addition, data storage 212 may be provided. In accordance with embodiments of the present invention, the data storage 212 may contain various applications that can be executed by the processor 204. In addition, the data storage 212 can contain data that is used and/or generated in connection with the execution of applications. Like the memory 208, the data storage 212 may comprise a solid state memory device. Alternatively or in addition, the data storage 212 may comprise a hard disk drive or other random access memory. In accordance with still other embodiments, the memory 208 may provide random access storage, while some or all of the data storage 212 may comprise read-only storage.

Examples of application programming or instructions that can be stored in data storage 212 includes the conference application 116. Alternatively or in addition, other applications can be maintained in data storage 212. Examples of such applications include a calendar application 216, a telephony application 220, a video telephony application 224, an instant messaging application 228, an email application 232, a unified messaging application 236, or other communication or general purpose user applications 240. The data storage 212 may also function to store operating system software. Moreover, as noted above, the data storage 212 may store data maintained for and/or generated by applications running on the local device 104, 108 or on some other device 104, 108. In addition, the data storage 212 generally includes a user interface application 244. The user interface application 244 may comprise a web browser or other application for presenting output to and/or receiving input from a user of the device 104, 108. Moreover, the user interface application 244 may operate in cooperation with another application running on a local or remote server 104 or device 108. A presence application 246 can also be included.

A server 104 or client device 108 may also include one or more user input devices 248. Examples of user input devices include a keyboard, a pointing device combined with a display screen or other position encoder, a microphone, a microphone operating in cooperation with voice recognition software and a keypad. In addition, one or more user output devices 252 may be provided. Examples of user output devices 252 include a display and audio output. A server 104 or client device 108 also generally includes one or more communication network interfaces 256. For example, a packet data network interface, such as a wired or wireless Ethernet interface or cellular packet data interface may be provided, for instance to support Internet protocol communications. Additional examples of a communication network interface 256 include a telephony network interface or other wireless or wireline interfaces.

The conference application 116, as illustrated in FIG. 1, may be provided as part of a communication server 104. Alternately, the conference application 116 may be executed by one or more client devices 108 alone or in combination with a communication server 104. In general, the conference application 116 provides conference participant finder functionality as described herein. This conference participant finder functionality provides for the automatic identification of conference participants who have earlier indicated their acceptance of an invitation to participate in a conference, but who are not present at the start of that conference. In addition, the conference participant finder function may include obtaining one or more contact or communication addresses for the participant, and initiating a communication to that address or addresses sequentially or simultaneously until the missing participant has successfully been contacted or all measures to contact them have been exhausted. In accordance with further embodiments of the present invention, the conference participant finder functionality can include selecting one or more appropriate communication addresses for use in attempting to contact the missing conference participant using presence information.

The conference application 116 may also present or cause to be presented to a conference host, administrator (hereinafter conference host), or all conference attendees a depiction of the status of conference participants. This status information can include an identification of invited conference participants, an indication as to whether the conference participant has accepted an invitation to join the conference or has declined such an invitation, and whether a participant who accepted the invitation is on the call (i.e., present). In addition, for a participant who has accepted an invitation but is not present, an estimated arrival time may be presented. Alternatively or in addition, other ways to identify the appropriate ways to contact a missing participant and other ways to indicate the status of the missing participant can be used. Other functions and features provided by a conference participant finder application 116 in accordance with embodiments of the present invention will be described in connection with the interaction of the conference participant finder application 116 with other applications A calendar application 216 generally provides an electronic calendar that a user associated with a client device 108 uses to record the dates and times of scheduled events, including conferences. Accordingly, a calendar application 216 may be provided with schedule information entered manually by the user through a user input 248. Alternatively or in addition, a calendar application 216 can receive event information from other applications. For instance, an email application 232 may receive an electronic message comprising an invitation to the user to join a conference at a particular date and time. Upon receipt of such an invitation, the calendar application 216 may check the time and date of the conference that is the subject of the invitation against previously scheduled events in the user's calendar, and can warn the user if acceptance of the invitation would present a conflict. Where the user accepts an invitation to join a conference, the calendar application 216 may enter the time and date of the conference, and information identifying the conference, in the user's calendar. As yet another feature, a calendar application 216 can generate reminders to the user of upcoming events and/or the start of scheduled events. Alternatively or in addition, other ways, whether manual or automatic, can be used to generate and accept calendar invites.

A telephony application 220 may operate to pass voice and other audible data to and from the associated client device 108. As an example, a telephony application 220 may comprise a voice over Internet protocol (VoIP) application that allows a client device 108 comprising a general purpose computer to function as a telephone. As a further example, for instance where the client device 108 comprises a personal digital assistant or a telephone, the telephony application 220 may comprise basic operating instructions or features of the device 108.

A video telephony application 224 may be provided to support audio-visual communications passed to and from the client device 108. Accordingly, a video telephony application 224 may allow a client device 108 to function as a video phone. As a further example, the video telephony application 224 may comprise basic operating instructions for a dedicated video telephony device.

An instant messaging application 228 may be provided to support instant messaging functions. In general, an instant messaging application 228 will be executed by a client device 108 in association with other applications and/or features of the client device 108. Accordingly, a client device 108 can support real-time text messages and the missing participant can respond with an indication of their intent to join. For example, the missing participant can respond via an instant message by making a menu selection or otherwise responding in accordance with provided instructions that they intend to join, and can provide a telephone number or other contact address that they can be called on.

An email application 232 may be included to support electronic messages. As noted previously, the email application 232 may include functions that operate in combination or cooperation with other applications. For instance, in connection with scheduling a conference, a conference host can send an invitation to a group of invitees by email. Moreover, the email application 232 may collect responses from the invitees as to whether the invitees will or will not participate in the conference. In addition, an email application 232 running on a client device 108 associated with an invitee can provide the invitation to a calendar application 216 running on that client device 108 or on another client device 108 associated with the user to determine whether the subject conference conflicts with any other event in the user's calendar, and to enter a record of the conference in the user's calendar if the user chooses to accept the invitation.

A unified messaging application 236 generally provides a user with an access point to multiple communication channels. For example, a unified messaging application 236 might present a single list of communications that are pending attention by the user. The unified list could therefore include a number of email messages, voice messages and text messages received by communication addresses associated with the user. By selecting particular items from the list, the user can choose to receive, respond to, and/or otherwise interact with included communications. Moreover, a unified messaging application 236 may operate in cooperation with other applications, such as a calendaring application 216.

Other communication applications 240 may include applications such as direct connect radio communications. Other examples include software implemented radio. In general, any existing or new communications device type or method can be used to communicate to the missing participant.

A user interface application 244 may comprise an application that is operable to present information to and/or receive input from a user of a client device 108. An example of a user interface application 244 includes a web browser application. Moreover, a user interface application 244 may operate in association with a conference application 116 running on a remote server 104 or client device 108, or on a local client device 108. In particular, the user interface application 244 may function as a user interface for a conference application 116. The user interface application may also operate as a user interface with respect to other applications, or to present data or information stored locally or remotely.

A presence application 246 may comprise an application that operates to determine the presence of a person. In accordance with embodiments of the present invention, a presence application 246 can be used to determine the presence of a conference participant. Accordingly, the presence application can operate to provide one or more appropriate contact addresses for a conference participant that the conference application 116 can apply in attempting to contact an expected but absent conference participant as described herein.

Figure 3:
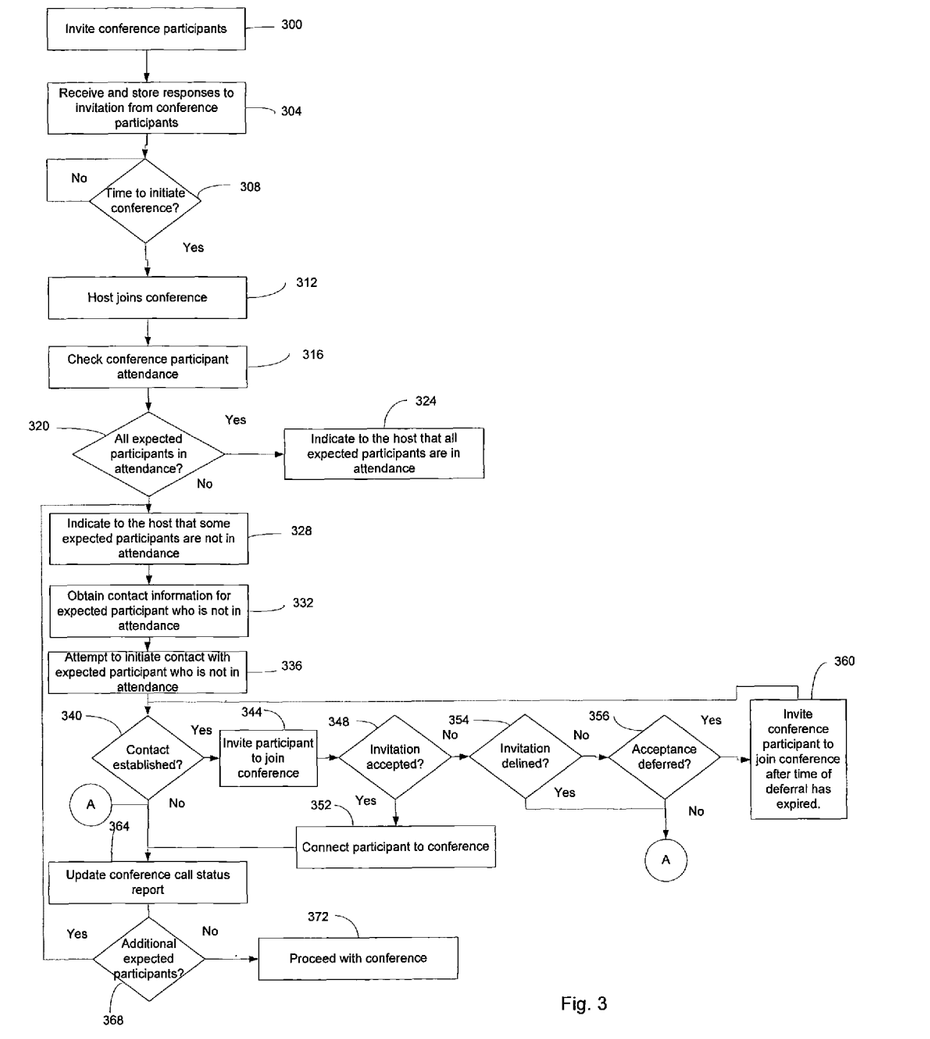
FIG. 3 is a flow chart depicting aspects of the operation of a conference participant finder function in accordance with embodiments of the present invention.

FIG. 3 illustrates aspects of the operation of a system 100 incorporating a conference application 116 featuring a conference participant finder function in accordance with embodiments of the application. Initially, at step 300, the desired conference participants are invited to the conference.

Generating and sending the invitation can be performed through the operation by the conference host or a delegate of the conference application 116, and can include operation of the conference application in cooperation with an email application 232. Alternatively or in addition, an invitation can be posted in a public location, such as a social networking site that participants to be invited frequent. Invited participants can then add the conference to their calendars manually or automatically from the social networking site. In addition, notices can be sent out that a new conference has been scheduled, and interested parties can view the notice on a public site. The invitation generally informs the desired conference participants of the time and date of the conference, and requests that the desired conference participant reply by accepting, declining, or tentatively accepting the invention. The responses from desired conference participants that are received can be stored, to provide a record of the desired participants' replies (step 304). This function can also be performed by the conference application 116.

At step 308, the system waits for the start time of the conference. When the start time of the conference is reached, the host will typically join or initiate the conference (step 312). As can be appreciated by one skilled in the art, as the host and other participants join the conference, their presence will be recognized, either automatically, or by taking manual registration steps. For example, the conference application 116 can monitor the conference to determine which of the expected participants are present by determining whether communication channels associated with particular participant identifiers, such as conference IDs or caller IDs, have been opened to the conference. The conference application 116 can thus perform a check to determine whether all of the expected participants are in attendance (step 316). In addition, the host can then access the conference participant status using the conference application 116 to determine which of the expected participants have joined the call. The host accessing the conference application 116 to check the conference participant status can include accessing a user interface generated by or in association with the conference application 116. If it is determined that all of the expected participants are in attendance (i.e. are present) (step 320), the conference application 116 can generate a signal to the host indicating that all of the expected participants are present (step 324). In addition, other conference participants can also be provided with the signal.

If all of the expected conference participants are not in attendance, the conference application 116 can indicate to the host that some or all of the expected participants are not in attendance (step 328). The conference application 116 can also obtain presence and contact information for expected conference participants who are not in attendance (step 332). Obtaining contact information can include accessing the record of responses from desired conference participants who accepted the invitation to participate in the conference to locate a contact address for those participants. The conference application can then attempt to establish contact with expected conference participants who are not in attendance based on their presence and communication preferences (step 336).

Establishing contact is performed by or in association with the conference application 116. In particular, the conference application 116, either automatically or after receiving a signal from the conference host or other authority, locates a contact address for a first absent conference participant. As noted above, this can include obtaining a contact address from a record stored by the conference application 116. Alternatively or in addition, a contact address can be obtained by the conference application 116 from another application. Moreover, the obtaining and/or selection of an appropriate contact address may be performed by the conference application 116 in association with a presence application 246. In addition, multiple attempts to contact the absent conference participant using different communication channels can be made.

If contact with an expected conference participant who was not present on the call (step 340), that conference participant may be asked to join the conference in progress (step 344). The form of this invitation can depend on the form of the communication channel that has been established with the conference participant. For instance, if a voice communication channel is used, the conference participant that has been contacted may be invited to respond by pressing or saying "1" to join the conference immediately, "2" to decline, or "3" to join later. If a communication channel for textual communications, such as email or instant messaging, is used, the message asking the expected conference participant to join the conference in progress can include or present links or buttons that allow the recipient to, for example, one of the three preformatted replies. It can also include a text communication that is sent to the host and the host can manually, set their expected arrival time or remove them from the list of expected attendees. In accordance with embodiments of the present invention, where the expected conference participant that receives the request to join the conference in progress needs additional time before joining, and replies by indicating that they will join late, the expected conference participant can be asked to provide an estimate of the time at which they expect to join.

If the expected conference participant accepts the invitation in progress (step 848), that participant can be connected or joined to the conference (step 352). Where, for example, the conference is telephonic, and where invitation to join the conference in progress is made using a voice communication channel or another channel that supports voice communications, that same channel can be used to connect the participant to the conference. Where the conference is using a communication medium or method that is different than the one used to contact the expected conference participant, the participant can be joined by establishing a second communication channel with the participant. This second communication channel may be one that the participant specifies expressly (e.g. by indicating a communication address to use in indicating that they would join the conference in progress) or one that the conference application 116 selects or is provided with by another application, such as a presence application 246.

If the invitation to join the conference in progress is not accepted (step 348), a determination can be made as to whether it has been declined (step 354). If the expected conference participant declines the invitation to join the conference in progress, this can be noted in the conference records maintained by the conference application 116, and further attempts to contact the declining participant will be made.

If the invitation to join the conference in progress is not declined (step 354), a determination can be made as to whether acceptance has been deferred (step 356). If acceptance has been deferred, the expected conference participant requesting deferral can be contacted after a time of deferral has expired (step 360). As noted, the time of deferral may be a time that the participant requesting the deferral has provided, for example in the form of an estimated time of arrival or an estimated delay. The time of deferral may also be determined by the conference application 116. For example, the conference application 116 may attempt to re-contact the participant requesting a deferral after some predetermined period of time (e.g. 10 minutes). In accordance with still other embodiments, the attempt to re-contact can be made by the conference application after some pre-determined period of time that is less than a period of time indicated by the expected conference participant requesting deferral.

If contact is not established with the expected conference participant (step 340), an indication of the status of the conference call can be updated (step 364). For example, a status report displayed to the conference host can be updated to indicate that the system was not able to establish contact with the expected conference participant, and/or that the status of the expected conference participant is unknown. Similarly, after indicating that contact was not established with the expected conference participant responded (step 356), connecting an expected conference participant to the conference (step 352), or receiving an indication that an expected conference participant has declined the request to join (step 354), the status report displayed to the conference host can be updated (step 364). A determination can then be made as to whether there any additional expected conference participant that have not yet joined the conference (step 368). If there are additional expected conference participants, the process can return to step 328. If there are no additional expected conference participants, then the conference may proceed with those participants then present (step 372).

Figure 4:
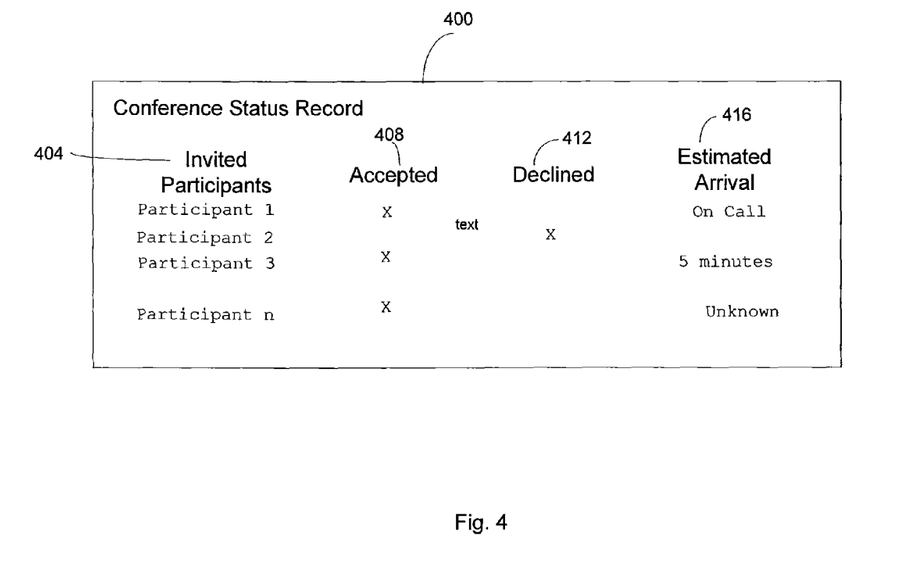
FIG. 4 is an example of a user interface that may be presented to a conference host in accordance with embodiments of the present invention.

FIG. 4 illustrates an example of a conference call status report 400 that can be displayed to the conference host. In this example, information regarding the status of the conference call is displayed in a table. A first column of the table lists invited conference participants 404. A second column 408 indicates whether an invited conference participant has accepted the invitation to join the conference call. An invited participant who has accepted the invitation is an expected conference participant. A third column 412 indicates whether an invited conference participant has declined the invitation to join the conference call. A fourth column indicates an estimated arrival time for an invited conference participant. In general, the status of an invited conference participant can change at different times. For instance, when a host causes invitations to be sent, the list of invited participants 404 in the conference call status report 400, which may be maintained by or in association with the conference application, can be populated. As invited participants respond to the invitation (or change their response), entries in the accepted 408 or declined 412 columns can be made as appropriate. After the start of the conference, an expected conference participant who is no longer able to participate and who does not join can decline an invitation to join issued by the conference application 116. The estimated arrival time 416 can be updated to indicate that invited participants are on the call (i.e. are present in the conference) as they arrive. Invited participants who have indicated a late arrival can be associated with a stated estimated time of arrival, or simply and indication that they are expected to join late. Invited participants who earlier accepted the invitation by are not present after the conference has started, and who have not been successfully contacted, can be associated with an "unknown" estimated time of arrival.

Although a status table 400 is shown, it should be appreciated that other embodiments of the present invention can display information to the conference host through other means. For example, information regarding the status of conference participants can be displayed graphically. In addition, a display need not be provided, or can be provided at the option of the conference host. Moreover, the amount of information displayed can be different for different implementations, or for different user configuration arrangements. In addition, embodiments of the present invention can be implemented as alternative stand-alone interfaces as well as interfaces that have been integrated into multi-modal conferences.

A conference system with a conference application for finding conference participants has been described. The conference system provides for an automated means by which a conference host or other authority can administer a conference. In particular, the system maintains a record of conference participant status. Moreover, the conference participant status can be used by the system of identify conference participants who are expected to join a conference, and to automatically contact those participants if they are late to join a conference. Accordingly, embodiments of the present invention remove the need for a conference host to manually determine the identity of the conference participants, which of the expected conference participants are late to join the conference, and contact addresses for expected conference participants who are late to join the conference.

Although embodiments of the described invention have application to telephonic conference calls, they also can be applied in other communication contexts. For example, embodiments may be applied in connection with video conferences, and web enabled conferences. In addition, embodiments of the present invention can make use of presence information in determining how best to contact expected participants who are absent at the start of a conference.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with various modifications required by the particular application or use of the invention. It is intended that the appended claims be construed to include alternative embodiments to the extent permitted by the prior art.

What is claimed is:

1. A method for finding conference call participants, comprising:

providing a plurality of conference call participants with an invitation to participate in a conference call;

receiving responses from a number of the plurality of conference call participants to the invitation, wherein at least one of the conference call participants accepts the invitation;

creating an electronic record of the conference call participants that have accepted the invitation;

after creating the electronic record of the conference call participants that have accepted the invitation, initiating the conference call;

determining that at least one conference call participant that accepted the invitation has not joined the conference call;

identifying the at least one conference call participant that accepted the invitation and has not joined the conference call;

providing an output to a conference call host including a notification that at least one conference call participant that accepted the invitation has not joined the conference call, wherein identifying the at least one conference call participant includes obtaining a first communication address associated with the at least one conference call participant;

initiating a communication with the at least one conference call participant that accepted the invitation and has not joined the conference call using the first communication address;

establishing a first communication channel with the first communication address;

presenting a plurality of options to the at least one conference call participant as part of a first communication over the first communication channel; and receiving a selection from the at least one conference call participant of one of the plurality of options, wherein a selection of an option to defer joining the conference call for a specified period of time is received.

2. The method of claim 1, wherein at least one of the invitations to participate in the conference call is posted in a publication that at least one of the plurality of conference call participants frequent, and further comprising the step of automatically adding the at least one of the invitations to a calendar based on the posting.

3. The method of claim 1, wherein a selection of an option to join the conference call immediately is received from the at least one conference call participant, and wherein the conference call participant is joined to the conference call using the first communication channel.

4. The method of claim 1, wherein a selection of an option to join the conference call immediately using a second communication channel is received from the at least one conference call participant, and wherein the conference call participant is joined to the conference call using the second communication channel.

5. The method of claim 1, wherein following an expiration of the specified period of time, a second communication channel to the first communication address is initiated.

6. The method of claim 1, wherein the selection of an option to defer joining the conference call for a specified period of time is associated with a request by the conference call participant to be contacted at a second communication address, and wherein following the expiration of the specified period of time a second communication channel to the second communication address is initiated.

7. The method of claim 1, wherein a selection of an option to decline the conference call is received, and wherein the first communication channel is discontinued.

8. The method of claim 1, wherein initiating a communication with the at least one conference call participant includes:

determining the first communication address associated with the at least one conference call participant from a presence of the at least one conference call participant;

from the determined presence of the at least one conference call participant, establishing a first communication channel with the first communication address.

9. The method of claim 1, further comprising:

determining that a key conference participant has declined to join the conference call;

for each conference call participant, checking an electronic calendar;

rescheduling the conference call.

10. The method of claim 1, wherein the conference call includes at least one of a voice call and a video call, and wherein the first communication address of the at least one conference call participant is at least one of an instant messaging address and an email address.

11. A system for finding conference call participants, comprising:

data storage, including:

a plurality of conference invitation records to participate in a conference call;

a conference record, wherein conference call participants and whether those conference call participants accepted or declined participation in a first conference are included in the conference record, and wherein the conference record is created prior to initiation of the first conference;

a first communication device associated with a host of the first conference; and a conference application, wherein the conference application is provided with information included in the conference record and whether those conference call participants accepted or declined participation in the first conference, wherein the conference application is operable to:

identify at least a first conference call participant who accepted participation in the first conference and who is not present during the first conference;

initiate a communication channel to the at least first conference participant to invite the at least first conference participant to join the conference;

present a plurality of options to the at least first conference call participant as part of a first communication over the first communication channel; and receive a selection from the at least first conference call participant of one of the plurality of options, wherein a selection of an option to defer joining the conference call for a specified period of time is received; and a communication application, wherein a communication channel address obtained from a presence application is provided to the communication application to initiate the communication channel to the at least first conference call participant.

12. The system of claim 11, further comprising:

a user output, wherein the conference record is output to a conference host as a conference status report.

13. A conference method, comprising:

storing a list of conference call participants in a conference record;

sending invitations to the conference call participants on the list to join a conference;

receiving responses from at least some of the conference call participants indicating whether the at least some of the conference call participants will or will not join the conference;

storing received information indicating whether the at least some of the conference call participants will or will not join the conference in the conference record, wherein the received information indicating whether the at least some of the conference call participants will or will not join in the conference is stored in the conference record prior to initiating the conference;

initiating the conference;

determining that at least some expected conference call participants are not present;

retrieving a contact address for each of the expected conference call participants who are not present;

attempting to communicate with the expected conference call participants for whom a contact address was retrieved;

establishing a first communication channel with a first communication address;

presenting a plurality of options to at least one conference call participant as part of a first communication over the first communication channel; and receiving a selection from the at least one conference call participant of one of the plurality of options, wherein a selection of an option to defer joining the conference call for a specified period of time is received.

14. The conference method of claim 13, wherein at least storing a list of conference call participants in the conference record, storing received information indicating whether the at least some of the conference call participants will or will not join the conference in the conference record, determining that at least some expected conference call participants are not present, and retrieving a contact address for each of the expected conference call participants who are not present are performed by a conference application.

* * * * *